United States Patent
Aso et al.

(10) Patent No.: US 8,027,323 B2
(45) Date of Patent: Sep. 27, 2011

(54) PACKET TRANSFER CONTROL DEVICE AND MOBILE NODE

(75) Inventors: Keigo Aso, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 607 days.

(21) Appl. No.: 12/282,484

(22) PCT Filed: Mar. 16, 2007

(86) PCT No.: PCT/JP2007/055437
§ 371 (c)(1),
(2), (4) Date: Sep. 10, 2008

(87) PCT Pub. No.: WO2007/108422
PCT Pub. Date: Sep. 27, 2007

(65) Prior Publication Data
US 2009/0052425 A1    Feb. 26, 2009

(30) Foreign Application Priority Data
Mar. 17, 2006    (JP) .................................. 2006-075611

(51) Int. Cl.
*H04W 4/00*    (2009.01)
(52) U.S. Cl. ....................................................... 370/338
(58) Field of Classification Search .................. 370/338, 370/331, 351, 352, 328, 389, 349, 401, 402–403, 370/404, 392, 468, 471, 252
See application file for complete search history.

(56) References Cited

U.S. PATENT DOCUMENTS

| 7,299,044 | B2 | 11/2007 | Ikeda |
| 7,616,615 | B2 * | 11/2009 | Sueyoshi et al. ............... 370/338 |
| 7,936,761 | B2 * | 5/2011 | Takeda ..................... 370/395.21 |
| 2005/0007995 | A1 | 1/2005 | Inoue |
| 2006/0002344 | A1 | 1/2006 | Ono |
| 2007/0036115 | A1 | 2/2007 | Ono |

FOREIGN PATENT DOCUMENTS

| EP | 1 841 147 | 10/2007 |
| EP | 1 865 669 | 12/2007 |
| EP | 1 865 670 | 12/2007 |
| EP | 1 855 427 | 3/2008 |

(Continued)

OTHER PUBLICATIONS

International Search Report dated Jun. 26, 2007.

(Continued)

*Primary Examiner* — Chi Pham
*Assistant Examiner* — Alexander Boakye
(74) *Attorney, Agent, or Firm* — Dickinson Wright PLLC

(57) ABSTRACT

Disclosed is technique for avoiding packet reflection between home agents. According to the technique, a MN 10 includes a home address (HoA1) assigned thereto from a home network 12, and a home address (HoA2) assigned thereto from a home network 14. CoA is further acquired from a foreign network 15. Then, the MN uses the home addresses as care-of addresses, and performs binding-update including HoA1-HoA2 for the HA 12 and binding-update including HoA2-HoA1 as well as HoA2-CoA for the HA 14. A packet transmitted from a CN 16 to HoA1 is encapsulated by the HA 12 and transferred to the HA 14. The HA 14 refers to a source address of the received encapsulated packet and selects CoA as a transfer destination address instead of HoA2 having the same prefix.

6 Claims, 13 Drawing Sheets

FOREIGN PATENT DOCUMENTS

| | | |
|---|---|---|
| JP | 2004-129210 | 4/2004 |
| JP | 2004-221864 | 8/2004 |
| JP | 2005-33374 | 2/2005 |
| JP | 2006-93928 | 4/2006 |
| WO | 2004/105272 | 12/2004 |
| WO | 2005/034448 | 4/2005 |
| WO | 2006/077835 | 7/2006 |
| WO | 2006/093288 | 9/2006 |
| WO | 2006/104202 | 10/2006 |
| WO | 2006/106712 | 10/2006 |

OTHER PUBLICATIONS

A. Conta, et al., "Generic Packet Tunneling in IPv6 Specification," RFC2473, Dec. 1998, pp. 1-36, p. 5, Line 10.

D. Johnson, et al. "Mobility Support in IPv6," RFC3755, Jun. 2004, pp. 1-165.

\* cited by examiner

FIG. 11
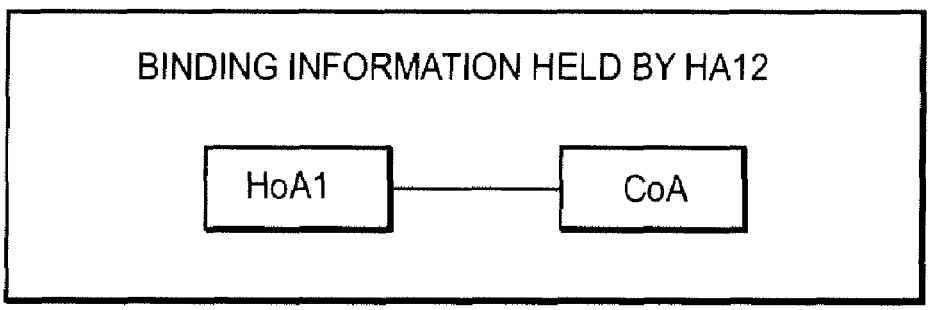
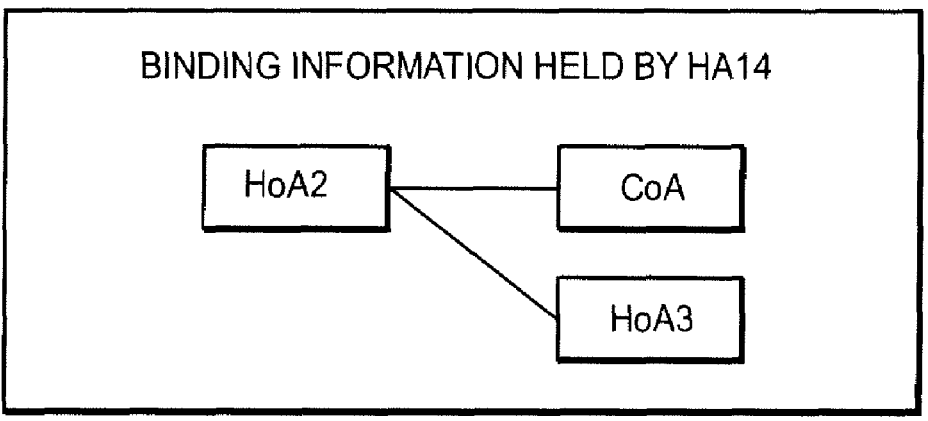
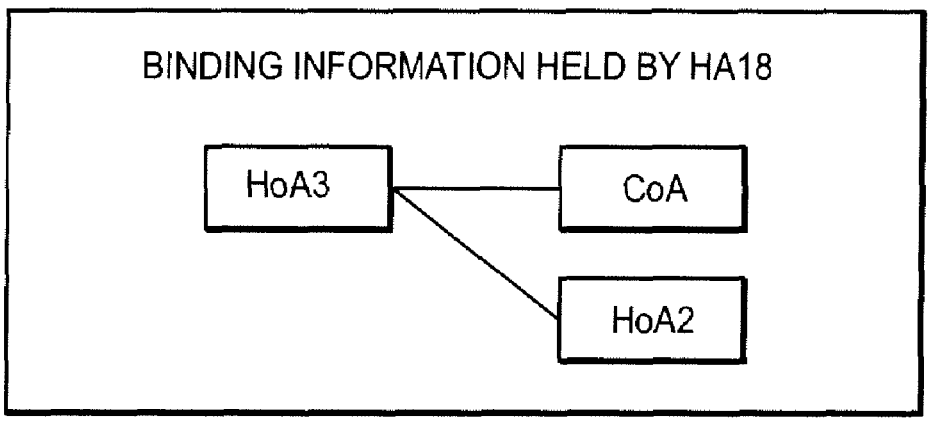

PACKET TRANSFER CONTROL DEVICE AND MOBILE NODE

TECHNICAL FIELD

The present invention relates to a packet transfer control device that transfers a packet and a mobile node that performs packet communication. More particularly, the present invention relates to a packet transfer control device having a home agent function specified by Mobile IPv6 and a mobile node enabling the continuous communication while changing connection points with networks.

BACKGROUND ART

Conventionally, Mobile IPv6 has been known as the technique for implementing mobility with layer 3. In Mobile IPv6, a Mobile Node (MN) has a home network, to which a HA residing in the home network assigns a Home address (HoA). On the other hand, when the MN moves away from the home network to connect with a foreign network, the MN acquires a care-of address (CoA) in the foreign network, and registers binding information indicating association of the home address with the care-of address at the Home Agent (HA) in its own home network, thus managing mobility.

In the case where a plurality of HAs existing on different home networks are assigned to one MN, each HA will assign a home address to the MN. Thus, the MN is allowed to switch a home address to be used depending on a communication partner, or to compare a load on communication path and a cost for use when the respective home addresses are used to select a home address most suitable to the request from the MN. Therefore, a significant effects can be obtained when a plurality of HAs and home addresses are assigned to one MN.

On the other hand, the plurality of HAs each assigning a home address to one MN exist independent of each other, and therefore when communication is performed using a home address assigned by each HA, the MN will use the conventional mobile IPv6 individually to the home addresses. That is to say, since the MN applies the mobile IPv6 to each of the addresses existing independent of each other, a plurality of operations according to mobile IPv6 will take place independent of each other.

FIG. 16 illustrates an exemplary network configuration including a MN 910 to which a plurality of HoAs are assigned in the conventional technique. The MN 910 can use a HA 911 existing in a home network 916 as its own home agent and a HA 912 existing in a home network 917. The MN 910 has a home address (HoA1) assigned thereto by the home network 916, where a HA 11 manages the HoA1. The MN 910 further has a home address (HoA2) assigned thereto by the home network 917, where the HA 912 manages the HoA2.

In FIG. 16, the MN 910 connects with a foreign network 913 via an interface (IF) 920, to which a CoA is assigned by the foreign network 913. The HA 911 and HA 912 each have a binding cache registered therein, where the CoA is assigned with the home address (HoA1, HoA2). Further, the MN 910 uses HoA1 for the communication with a Correspondent Node (CN) 914, and uses HoA2 for the communication with a CN 915. Herein, a packet transmitted from the CN 914 to HoA1 of the MN 910 passes through a communication path 919a via the HA 911, and a packet transmitted from the CN 915 to HoA2 of the MN 910 passes through a communication path 919b via the HA 912.

Then, when the MN 910 in such a state moves to connect with the home network 916 as one of its own home networks, HoA1 will be assigned to the interface of the MN 910. Thus, the communication with the CN 914 is switched from the communication using CoA via the HA 911 to direction communication using HoA1. Meanwhile, in order to continue the communication with the CN 915, the MN 910 associates HoA1 assigned to the interface as a care-of address of HoA2 and registers the same at the HA 912. In this case, since HoA1 is dealt with as just a care-of address for HoA2, a packet addressed to HoA2 will be transferred to HoA1 through normal processing by the HA 912.

In this way, in the case where one MN can use a plurality of HAs and HoAs, one of the home addresses can be used while being associated it with as a care-of address of the other home address. Further, not only when the home address is assigned to the interface because of the connection with the home network as stated above but also when a home address is not assigned to the interface because of the connection with the foreign network, the home address can be registered as a CoA. In this case, a still further HA can be designated as a new transfer destination of a packet proxy-received by a certain HA.

Meanwhile, Non-Patent Document 1 discloses a method of limiting the number of times of the encapsulation of a packet by using Tunnel Encapsulation Limit (TEL) option. More specifically, according to the technique disclosed by Non-Patent Document 1, an allowable number of times of the packet encapsulation is inserted in an encapsulation header as a TEL option, and when encapsulation is newly performed, a value obtained by subtracting from the allowable number of times is inserted into a new encapsulation header as TEL option, so that multiple encapsulation exceeding the number of times determined as the TEL option during the first encapsulation can be avoided.

Non-Patent Document 1: A. Conta, S. Deering, "Generic Packet Tunneling in IPv6 Specification", RFC2473, Dec. 1998

In the situation where a MN can use two HAs and home addresses, however, when each home address is associated with as a care-of address of the other home address, the two HAs will set home addresses managed by different HAs as their transfer destinations of packets, resulting in a possibility of reflection where packet transfer is repeated between the two HAs. For instance, in the connection state of the MN 910 as in FIG. 16, binding information with CoA and HoA2 associated with HoA1 can be registered at the HA 911, and binding information with CoA and HoA1 associated with HoA2 can be registered at the HA 912.

At this time, the HA 911 that receives as a proxy a packet transmitted by the CN 914 checks its own binding cache to select the next transfer destination from the plurality of care-of addresses (CoA and HoA2) associated with HoA1. Herein, in the case where HA911 selects HoA2 registered as a care-of address as the transfer destination, an encapsulated packet is transferred to the home network 917 and is received by the HA 912 as a proxy. At this time, similarly to the HA 911, the HA 912 checks its own binding cache to select the next transfer destination from the plurality of care-of addresses (CoA and HoA1) associated with HoA2. If the HA 912 selects as the transfer destination HoA1 registered as a care-of address, the encapsulated packet is transferred to the home network 916, which is then received again by the HA 911 as a proxy. In this way, if two HAs select the home addresses mutually managed as their transfer destination addresses, reflection occurs between the two HAs. As a result, a load on the transfer paths between the HAs will increase, thus causing delay in transferred packets or causing a packet loss.

Meanwhile, when receiving a packet as a proxy and transferring the packet, a HA encapsulates the packet. Thus, if reflection occurs between the two HAs as in the above, the packet transferred repeatedly between the two HAs will be subjected to multiple encapsulation as the reflection proceeds. Thus, the multiple encapsulation is detected using the TEL option defined by Non-Patent Document 1, for example, whereby the packet transfer repeated in accordance with the reflection can be suppressed.

The TEL option defined by Non-Patent Document 1, however, simply limits the encapsulation, and therefore another HA receiving the packet as a proxy will stop the further packet transfer. For instance, in the case where the TEL option is applied to the above-stated HA 911 and HA 912, it is possible to avoid, for the HA 911, further encapsulation and transfer of a packet by another HA by adding the TEL option with "0" set in the transmitted encapsulation packet. In this case, however, when receiving the packet including such a TEL option, the HA 912 judges that further encapsulation is not allowed because "0" is set in the TEL option, thus making it impossible to encapsulate the packet and transfer the same to a normal CoA as well.

On the other hand, when the TEL option is added with a value of "1" or larger set in the transmitted encapsulation packet, the HA 912 that receives this packet as a proxy is allowed to encapsulate a packet and transfer the same to a normal CoA. However, if reflection occurs, the reflection cannot be detected unless the HA 912 further transfers once or more (redundant transfer). Moreover, the TEL option defined by Non-Patent Document 1 simply limits the multiple encapsulation, which can only estimate the possibility that reflection may occur when the multiple encapsulation occurs upper limit number of times. In other words, the TEL option defined by Non-Patent Document 1 can estimate the occurrence of reflection, but cannot detect the occurrence of reflection accurately.

DISCLOSURE OF THE INVENTION

In view of the above-stated problems, it is an object of the present invention to provide a packet transfer control device and a mobile node by which, when the mobile node can use a plurality of home agents, reflection of a packet between two home agents among the plurality of home agents can be prevented mainly by the processing on the network side.

In order to fulfill the above-stated object, a packet transfer control device of the present invention that controls packet transfer in a first home agent belonging to a first home network, and the packet transfer control device includes: binding information management means that manages an address of a mobile node having, in addition to a first home address assigned from the first home network, a second home address assigned from a second home network different from the first home network, and holds binding information in which at least the second home address is associated with as a care-of address of the first home address; and transfer destination selection control means that, when an encapsulated packet including the first home address as a destination address is received from a second home agent belonging to the second home network, controls so that the second home address is not selected as a transfer destination address of the encapsulated packet when the encapsulated packet is to be transferred.

With this configuration, when the mobile node can use a plurality of home agents, packet reflection between two home agents among the plurality of home agents can be prevented mainly by the processing on a network side.

In the packet transfer control device of the present invention, in addition to the above-stated configuration, the transfer destination selection control means is so arranged to refer to a source address of an outer header of the encapsulated packet or a destination address of an inner header of the encapsulated packet, and not to select, as the transfer destination address, an address having a same prefix as a prefix of the source address or a same address as the destination address from the care-of address in the binding information.

With this configuration, a home agent compares an address included in the encapsulated packet with an address included in the binding information held by itself, thus preventing transfer letting a packet back to the home agent as the transfer sender of the received encapsulated packet, so as to prevent packet reflection.

In addition to the above-stated configuration, the packet transfer control device of the present invention further includes: home agent information reception means that receives, from the mobile node, home agent information at least including an address of the second home agent or information that specifies the address of the second home agent; and home agent information holding means that holds the home agent information received by the home agent information reception means, wherein the transfer destination selection control means is so arranged to refer to a source address of an outer header of the encapsulated packet, and when an address of the second home agent obtained from the information held by the home agent information holding means agrees with the source address, and not to select as the transfer destination address an address having a same prefix as a prefix of the source address from the care-of address in the binding information.

With this configuration, a home agent compares an address included in the encapsulated packet with an address included in the binding information notified by the mobile node, thus preventing transfer letting a packet back to the home agent as the transfer sender of the received encapsulated packet, so as to prevent packet reflection.

In addition to the above-stated configuration, the packet transfer control device of the present invention further includes: option information confirmation means that confirms whether option information is added to the encapsulated packet or not, the option information indicating encapsulation by a home agent, and is so arranged that only when the option information confirmation means confirms that the option information is added to the encapsulated packet, the transfer destination selection control means does not select the second home address as the transfer destination address.

With this configuration, a home agent easily can specify, from the received encapsulated packets, the encapsulated packet that is transferred by proxy-reception by another home agent (the packet causing reflection).

In addition to the above-stated configuration, the packet transfer control device of the present invention further includes: encapsulation means that, when the encapsulated packet is transferred, further encapsulates the encapsulated packet using an outer header to which option information is added, the option information indicating encapsulation by a home agent.

With this configuration, a home agent can add information to the encapsulated packet transferred by proxy-reception, the information indicating that the encapsulated packet is generated by a home agent.

In order to fulfill the above-stated object, a mobile node of the present invention includes a first home address assigned by a first home network as well as a second home address assigned by a second home network different from the first home network. The mobile node includes: first binding information notification means that notifies a first home agent belonging to the first home network of binding information in which at least the second home address is associated with as a care-of address of the first home address; second binding information notification means that notifies a second home agent belonging to the second home network of binding information in which at least the first home address is associated with as a care-of address of the second home address; first home agent information notification means that notifies the first home agent of home agent information, the home agent information at least including an address of the second home agent or information that specifies the address of the second home agent; and second home agent information notification means that notifies the second home agent of home agent information, the home agent information at least including an address of the first home agent or information that specifies the address of the first home agent.

This configuration can notify each of the plurality of home agents that the mobile node uses of information that identifies the home agent.

With this configuration, the present invention has an effect of, when a mobile node can use a plurality of home agents, preventing the occurrence of reflection of a packet between two home agents among the plurality of home agents mainly by the processing on a network side.

BRIEF DESCRIPTION OF THE DRAWINGS

FIG. 11 schematically illustrates binding information of a MN in the third embodiment of the present invention.

BEST MODE FOR CARRYING OUT THE INVENTION

The following is a description of the first to third embodiments of the present invention, with reference to the drawings.

First Embodiment

Figure 1:
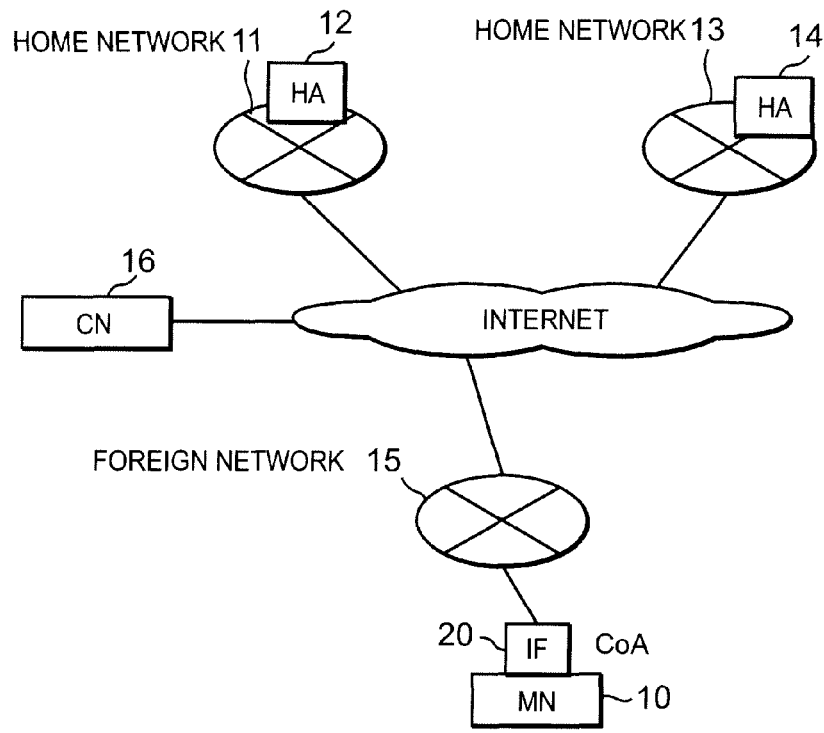
FIG. 1 illustrates an exemplary network configuration in the first embodiment of the present invention.

Firstly, the first embodiment of the present invention will be described below. FIG. 1 illustrates an exemplary network configuration in the first embodiment of the present invention. In FIG. 1, a MN 10 can use a HA 12 existing in a home network 11 as its own home agent and a HA 14 existing in a home network 13. The MN 10 has a home address (HoA1) assigned thereto by the home network 11 where the HA 12 manages the HoA1. The MN 10 further has a home address (HoA2) assigned thereto by the home network 13 where the HA 14 manages the HoA2.

The MN 10 connects with a foreign network 15, and a CoA acquired from the foreign network 15 is assigned to an interface (IF) 20. For the HA 12, the MN 10 has a binding cache registered therein where HoA1 and CoA are associated therewith, and a binding cache registered therein where HoA1 and HoA2 are associated therewith. For the HA 14, the MN 10 has a binding cache registered therein where HoA2 and CoA are associated therewith and a binding cache registered therein where HoA2 and HoA1 are associated therewith. Thereby, a packet addressed to HoA1 of the MN 10 transmitted from the CN 16 is received by the HA 12 as a proxy, which is then encapsulated and transferred to CoA or HoA2. A packet addressed to HoA2 of the MN 10 is received by the HA 14 as a proxy, which is then encapsulated and transferred to CoA or HoA1.

Figure 2:
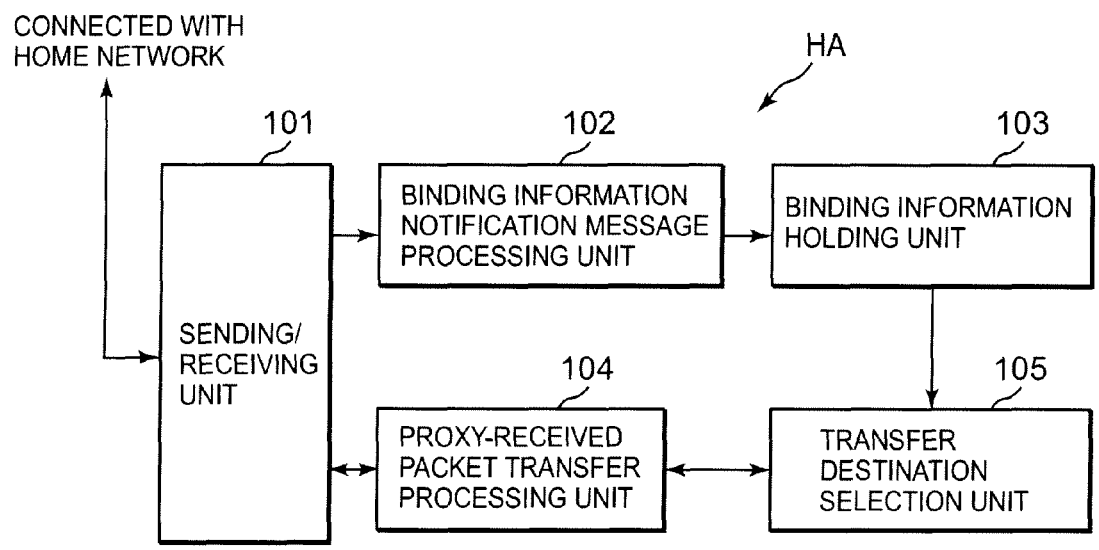
FIG. 2 illustrates an exemplary configuration of a HA in the first embodiment of the present invention.

The following describes the configuration of the HAs 12 and 14 in the first embodiment of the present invention. FIG. 2 illustrates an exemplary configuration of a HA (HA12 or 14 of FIG. 1) in the first embodiment of the present invention. In FIG. 2, the HA includes a sending/receiving unit 101, a binding information notification message processing unit 102, a binding information holding unit 103, a proxy-received packet transfer processing unit 104, and a transfer destination selection unit 105. Although the HAs 12 and 14 have various other functions, the illustration thereof has been omitted in FIG. 2.

The sending/receiving unit 101 has a packet sending/receiving function for enabling communication with any communication node in a network (e.g., the home networks 11 and 13 of FIG. 1) connected with the HAs 12 and 14, the MN 10 connected with the foreign network 15 (the MN 10 belonging to the home networks 11 and 13 where the HAs 12 and 14 exist), and any other communication nodes connected with any other networks.

The binding information notification message processing unit 102 processes a binding information notification message (binding update message) transmitted from the MN 10 to acquire binding information on the MN 10 included in the message and instructs to store the same in the binding information holding unit 103.

The binding information holding unit 103 stores the binding information passed from the binding information notification message processing unit 102.

The proxy-received packet transfer processing unit 104, upon receipt of a packet addressed to HoA of the MN 10 managed thereby, passes a home address of the MN 10 as a destination address of the proxy-received packet to the transfer destination selection unit 105, requests to select a care-of address to be used for the transfer destination of the packet, and encapsulates the address thus selected by the transfer destination selection unit 105 as a destination. At this time, the proxy-received packet transfer processing unit 104 passes, to the transfer destination selection unit 105, a prefix of the address set as a source address of the proxy-received packet, and requests to select a care-of address except for addresses including the same prefix.

Alternatively, in the case where a destination address of an inner packet in the proxy-received encapsulated packet can be extracted, the proxy-received packet transfer processing unit 104 may pass the thus extracted destination address of the inner packet to the transfer destination selection unit 105 and may request the transfer destination selection unit 105 to select not the same address but an address other than that as a care-of address for the transfer destination.

The transfer destination selection unit 105 has a function of, upon being requested to select the transfer-destination address from the proxy-received packet transfer processing unit 104, checking binding information held in the binding information holding unit 103 to find a binding cache corresponding to the notified home address, and selecting an address to be used from a plurality of care-of addresses associated therewith. The thus selected address is passed to the proxy-received packet transfer processing unit 104.

The transfer destination selection unit 105, upon receipt of a prefix (a prefix of the address set as the source address of the proxy-received packet) together with the home address of the MN 10, does not select an address having the same prefix as the received prefix but selects another address as a care-of address for transfer destination.

Alternatively, the transfer destination selection unit 105, upon receipt of the destination address of the inner packet together with the home address of the MN 10, does not select the same address as the received address but selects another address as a care-of address for the transfer destination.

As described above referring to FIG. 2, the HA in the first embodiment of the present invention is configured so as not to, when receiving an encapsulated packet as a proxy, select a care-of address having the same prefix as that of the source address of the encapsulated packet (or the same care-of address as the destination address of the inner packet of the encapsulated packet) as a transfer destination address. With this configuration, it becomes possible to avoid the transfer (reflection) letting a packet back to a HA as a source (transfer sender) of the encapsulated packet.

Figure 3:
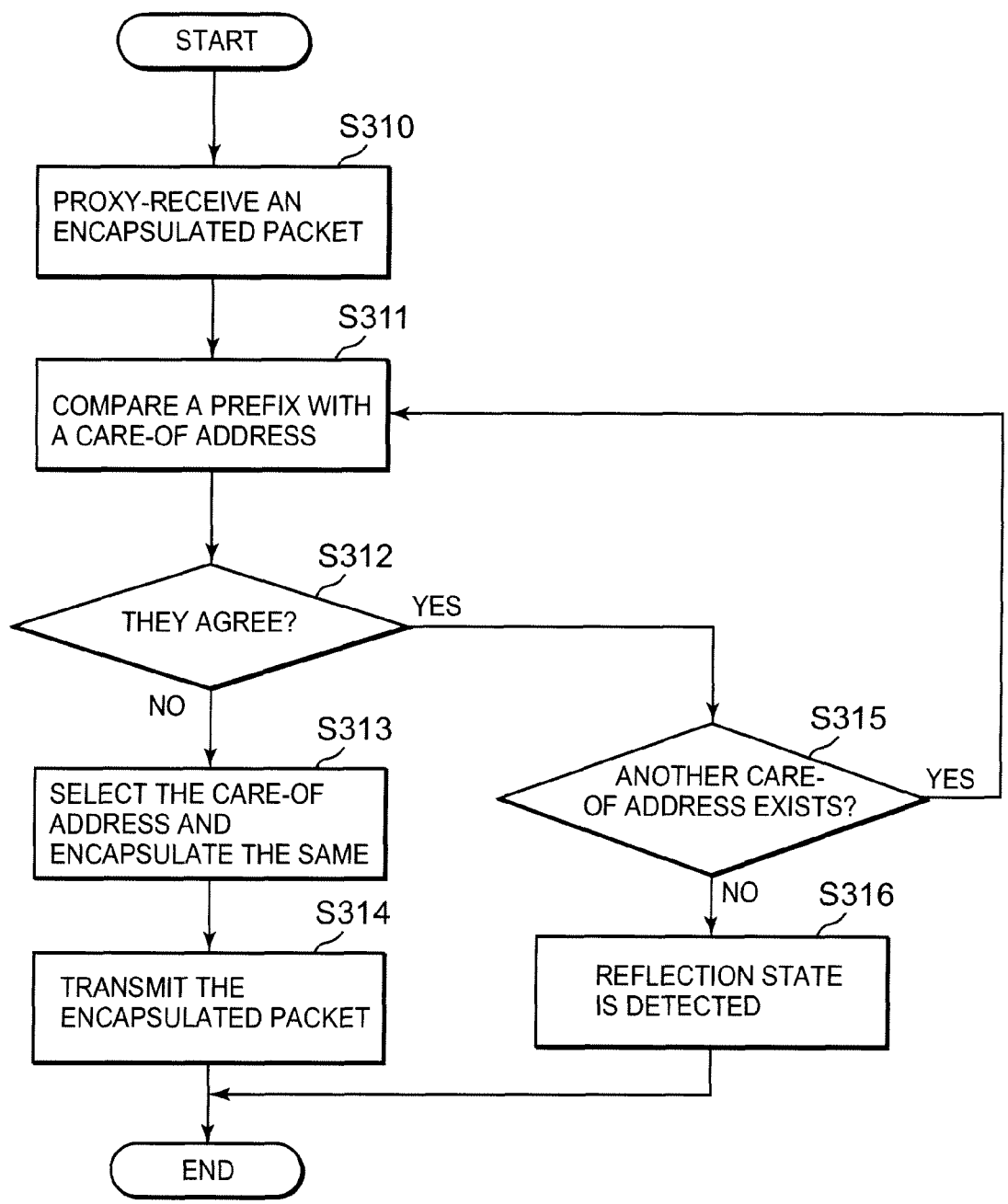
FIG. 3 is a flowchart showing an exemplary operation of a HA in the first embodiment of the present invention.

The following describes an exemplary operation of the HAs 12 and 14 in the first embodiment of the present invention. FIG. 3 is a flowchart showing an exemplary operation of a HA in the first embodiment of the present invention.

In FIG. 3, when receiving as a proxy an encapsulated packet addressed to HoA of the MN 10 (Step S310), the HA (HA 12, 14 of FIG. 1) compares a prefix of a source address of the encapsulated packet with a prefix of a care-of address of binding information held in the binding information holding unit 103 (Step S311). Then, judgment is made as to whether they agree with each other or not (Step S312), and if they do not agree, the HA generates an encapsulated packet including the care-of address as a destination address (Step S313) and transmits the encapsulated packet (Step S314).

On the other hand, if they agree with each other at Step S312, the HA checks as to whether there remains another care-of address not subject to the comparison in the binding information holding unit 103 (Step S315), and if a not-selected care-of address exists, the procedure goes back to Step S311 to compare the care-of address again. On the other hand, if not-selected care-of address does not remain (i.e., all of the care-of addresses in the binding information held in the binding information holding unit 103 have the prefix as the destination address of the encapsulated packet), a reflection state is detected (Step S316). If a reflection state is detected, any processing may be performed, such as the processing for canceling the reflection state, or the processing for notifying the MN 10 or other HAs of the reflection state.

At Step S311 of FIG. 3, comparison is made between the prefix of the address set as the source address of the proxy-received packet and the care-of address held in the binding information holding unit 103. However, comparison may be made between the destination address of the inner packet and the care-of address held in the binding information holding unit 103.

Figure 17:
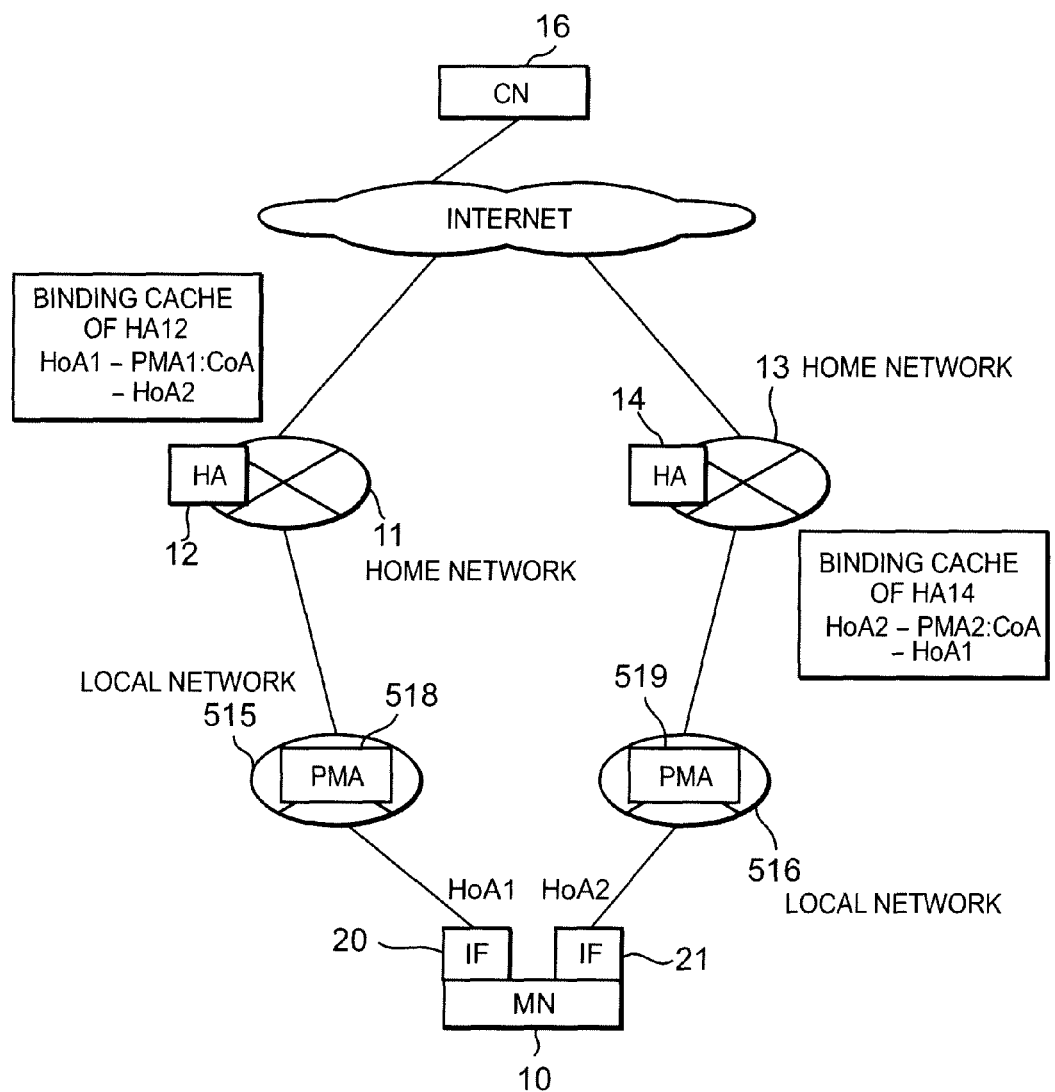
FIG. 17 illustrates another exemplary network configuration in the first embodiment of the present invention.

The technique according to the first embodiment of the present invention can function effectively in another exemplary network configuration of FIG. 17 as well. In FIG. 17, a MN 10 has two interfaces (IF 20 and IF 21), which are connected with a local network 515 and a local network 516, respectively, to which a network-based mobility protocol (e.g., Proxy Mobile IP (PMIP)) is provided. In the local networks 515 and 516, a PMA 518 and a PMA 519 exist respectively as proxy nodes (e.g., Proxy Mobile Agent (PMA)) that control movement as a proxy of the MN 10, thus exchanging a message between the HA 12 and the HA 14 managing the MN 10 according to the network-based mobility protocol.

To the MN 10, HoA1 is assigned from the HA 12, and HoA2 is assigned from the HA 14. The PMA 518 associates its own address as a care-of address with HoA1, which is registered at the HA 12, Whereas, the PMA 519 associates its own address as a care-of address with HoA2, which is registered in the HA 14.

In such a configuration, when the MN 10 associates HoA2 as a care-of address with HoA1 and registers the same at the HA 12, and associates HoA1 as a care-of address with HoA2 and registers the same at the HA 14 in order to obtain mobility between both of the IFs 20 and 21, reflection may occur between the HAs 12 and 14. In such a case, the technique described in the first embodiment of the present invention allows such reflection to be avoided.

Figure 18:
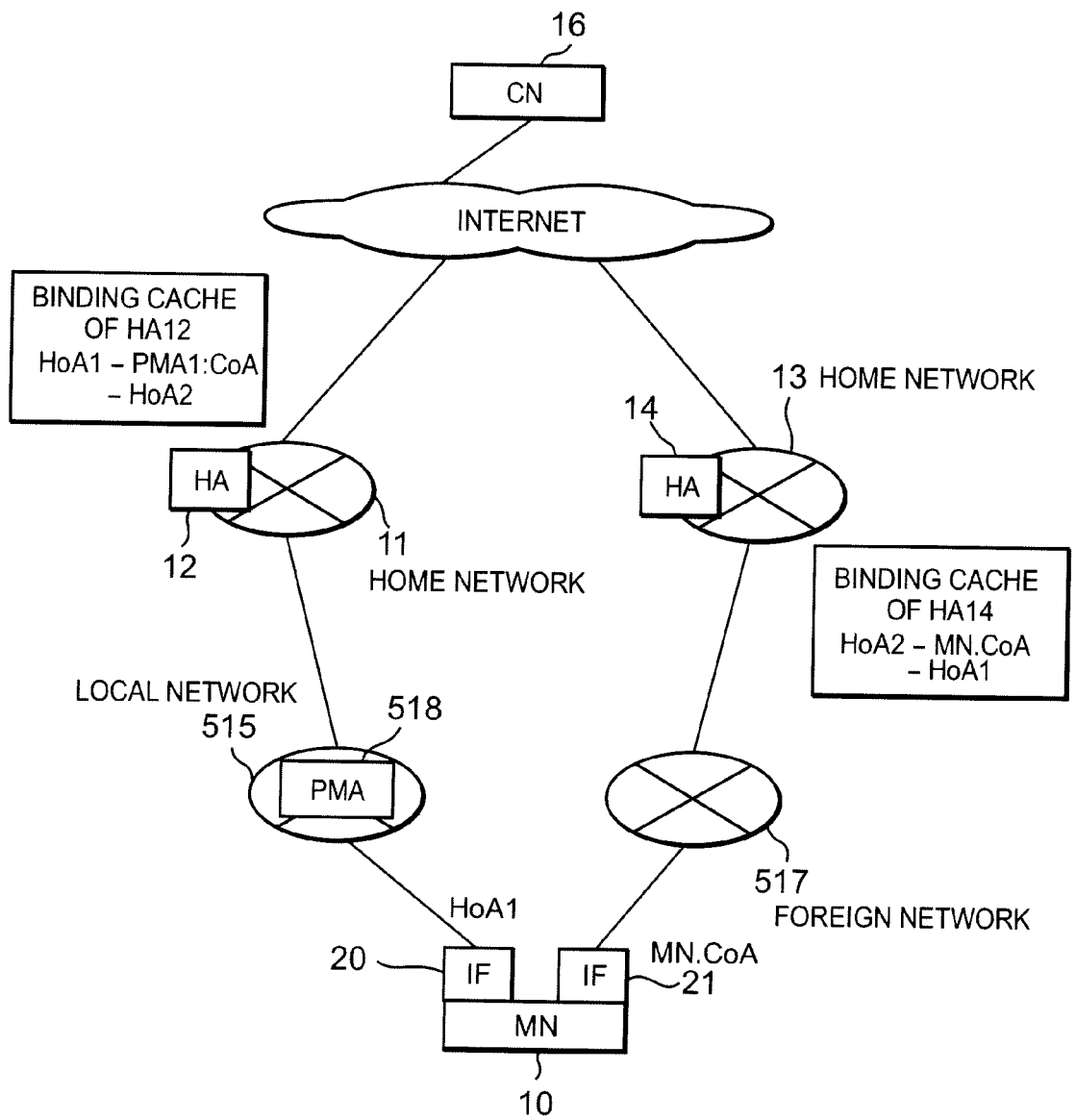
FIG. 18 illustrates still another exemplary network configuration in the first embodiment of the present invention.

Similarly in the case where, as shown in FIG. 18, the configuration includes a foreign network 517 to which a network-based mobility protocol is not provided instead of the local network 516 of FIG. 17 to which a network-based mobility protocol is provided, when HoA2 is associated as a care-of address with HoA1, which is then registered at the HA 12, and HoA1 is associated as a care-of address with HoA2, which is then registered at the HA 14, reflection may occur between the HAs 12 and 14. In this case also, the technique described in the first embodiment of the present invention allows such reflection to be avoided.

As described above, when an encapsulated packet is transferred, the first embodiment of the present invention enables a HA not to set a care-of address having the same prefix as that of a source address of the encapsulated packet or a care-of address that is the same as a destination address of an inner packet as a destination address of a packet transferred by further encapsulation. Further, when the encapsulated packet is transferred, if the HA finds that binding information only contains the care-of address having the same prefix as that of the source address of the proxy-received encapsulated packet or the care-of address that is the same as the destination address of the inner packet, the HA can detect the occurrence of reflection for the packet.

Second Embodiment

Next, the second embodiment of the present invention will be described below. In the above-stated first embodiment of the present invention, even when a packet received by a HA as a proxy is an encapsulated packet directly transmitted by a general node or a MN existing in a home network, the HA will not select a care-of address having the same prefix in a similar manner to the encapsulated packet generated for transfer to a MN so as to avoid reflection.

On the other hand, in the second embodiment of the present invention, a HA can find that a proxy-received packet is an encapsulated packet transmitted from another HA, whereby an inconvenient operation that might occur for a certain encapsulated packet in the first embodiment of the present invention can be solved. More specifically, when a packet received by a HA as a proxy is encapsulated and transferred, an option (in the description, called a Tunnel Home Agent (THA) option) is added to the transferred encapsulated packet, the option indicating that the encapsulated packet is generated by a HA.

Figure 4:
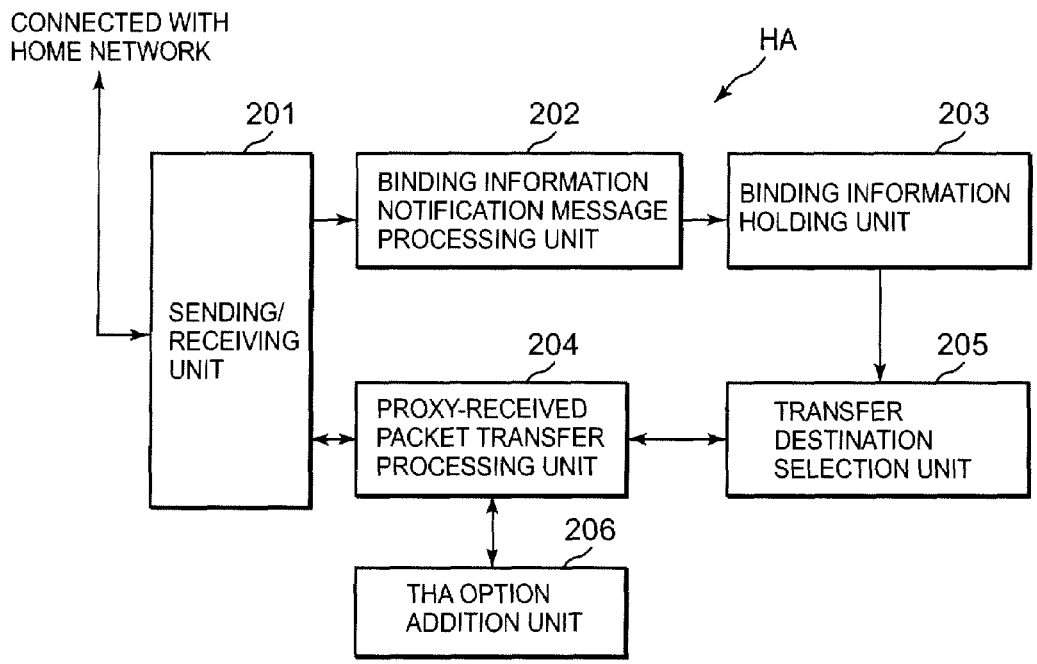
FIG. 4 illustrates an exemplary configuration of a HA in the second embodiment of the present invention.

The following describes the configuration of HAs 12 and 14 in the second embodiment of the present invention. FIG. 4 illustrates an exemplary configuration of a HA (HA 12 or 14) in the second embodiment of the present invention. In FIG. 4, the HA includes a sending/receiving unit 201, a binding information notification message processing unit 202, a binding information holding unit 203, a proxy-received packet transfer processing unit 204, a transfer destination selection unit 205, and a THA option addition unit 206. Although the HAs 12 and 14 have various other functions, the illustration thereof has been omitted in FIG. 4.

The sending/receiving unit 201 has a packet sending/receiving function for enabling communication with any communication node in a network (e.g., the home networks 11 and 13 of FIG. 1) connected with the HAs 12 and 14, the MN 10 connected with the foreign network 15 (the MN 10 belonging to the home networks 11 and 13 where the HAs 12 and 14 exist), and any other communication nodes connected with any other networks.

The binding information notification message processing unit 202 processes a binding information notification message transmitted from the MN 10 to acquire binding information on the MN 10 included in the message and instructs to store the same in the binding information holding unit 203.

The binding information holding unit 203 stores the binding information passed from the binding information notification message processing unit 202.

The proxy-received packet transfer processing unit 204, upon receipt of a packet addressed to HoA of the MN 10 managed thereby, firstly checks an extension header added to a header portion in the proxy-received encapsulated packet to judge as to whether a THA option is added thereto or not, the THA option indicating that this encapsulated packet is generated by a HA. If the encapsulated packet includes a THA option added thereto, it can be recognized that the encapsulated packet is encapsulated by another HA.

If the proxy-received encapsulated packet is encapsulated by another HA, the proxy-received packet transfer processing unit 204 passes a home address of the MN 10 as a destination address of the proxy-received packet to the transfer destination selection unit 205, and requests to select a care-of address to be used for the transfer destination of the packet. At this time, the proxy-received packet transfer processing unit 204 passes, to the transfer destination selection unit 205, a prefix of the address set as a source address of the proxy-received packet, and requests to select a care-of address except for addresses including the same prefix.

Then, the proxy-received packet transfer processing unit 204, upon receipt of the selected address from the transfer destination selection unit 205, generates an encapsulated packet with the address including a destination. During this encapsulation, the proxy-received packet transfer processing unit 204 instructs the THA option addition unit 206 to add a THA option as an extension header to be added to the outer header (encapsulation header).

On the other hand, if the proxy-received encapsulated packet does not include a THA option added thereto, that is, in the case where it is recognized that it is not encapsulated by another HA, the proxy-received packet transfer processing unit 204 requests the transfer destination selection unit 205 to select any care-of address to be used as the transfer destination of the packet and generates an encapsulated packet including as a destination the care-of address of the transfer destination received from the transfer destination selection unit 205. In other words, in the case where the proxy-received encapsulated packet is not encapsulated by another HA, any care-of address can be selected, which can be set as a destination address of the encapsulated packet.

Herein, in the case where the existence of the THA option makes it possible to recognize that such an encapsulated packet is encapsulated by another HA, the proxy-received packet transfer processing unit 204 may refer to a destination address of an inner packet, further recognize that the destination address of the inner packet is the home address of the MN 10 managed by the HA performing the encapsulation, and pass the address to the transfer destination selection unit 205 so as to request to select an address other than the address as a care-of address.

The transfer destination selection unit 205 has a function of, upon being requested to select the transfer-destination address from the proxy-received packet transfer processing unit 204, checking binding information held in the binding information holding unit 203 to find a binding cache corresponding to the notified home address, and selecting an address to be used from a plurality of care-of addresses associated therewith. The thus selected address is passed to the proxy-received packet transfer processing unit 204.

The transfer destination selection unit 205, upon receipt of a prefix (a prefix of the address set as a source address of the proxy-received packet) together with the home address of the MN 10, does not select a care-of address having the same prefix as the received prefix but selects another address as a care-of address for transfer destination.

Alternatively, the transfer destination selection unit 205, upon receipt of the destination address of the inner packet together with the home address of the MN 10, does not select the same address as the received address but selects another address as a care-of address for transfer destination.

The THA option addition unit 206 has a function of, in response to the instruction from the proxy-received packet transfer processing unit 204, adding a THA option as an option to be added to an outer header (encapsulated header) of the packet subjected to encapsulation and to be transferred.

As described above referring to FIG. 4, the HA in the second embodiment of the present invention is configured so that, when receiving an encapsulated packet as a proxy, checks as to whether a THA option indicating the encapsulation by another HA is added to the encapsulated packet or not, thus selecting encapsulated packets encapsulated by other HAs only. Further, the HA in the second embodiment of the present invention is configured so as not to, with respect to an encapsulated packet encapsulated by another HA, select a care-of address having the same prefix as that of the source address of the encapsulated packet (or the same care-of address as the destination address of the inner packet of the encapsulated packet) as a transfer destination address. With this configuration, it becomes possible to avoid the transfer (reflection) letting a packet back to a HA as a source (transfer sender) of the encapsulated packet.

Figure 5:
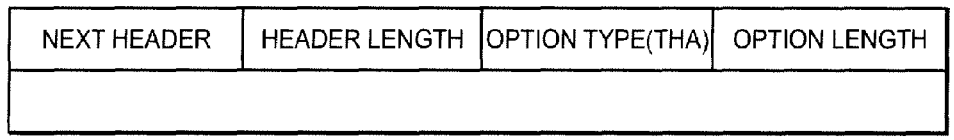
FIG. 5 illustrates a first exemplary THA option added to an encapsulated packet by a HA in the second embodiment of the present invention.

FIG. 5 illustrates an exemplary THA option added to an encapsulated packet by a HA in the second embodiment of the present invention. The THA option of FIG. 5 is described as an option included in a Destination Options Header, which is for allowing another HA that receives the encapsulated packet as a proxy to recognize that the encapsulated packet is generated by the HA. An extension header including the THA option of FIG. 5 has a Next Header for identifying a type of a header following an IPv6 header, a Header Length indicating a header length, an Option Type (THA) indicating that this option is a THA option, and an Option Length indicating an option length. The THA option may be configured as an option included in a Hop-by-Hop Options Header. A field included in a Routing Header or another header specified by IPv6 may contain information similar to that in the above-stated THA option. A Flow Label field or a Traffic Class field in the IPv6 header may contain information similar to that in the above-stated THA option.

Figure 6:
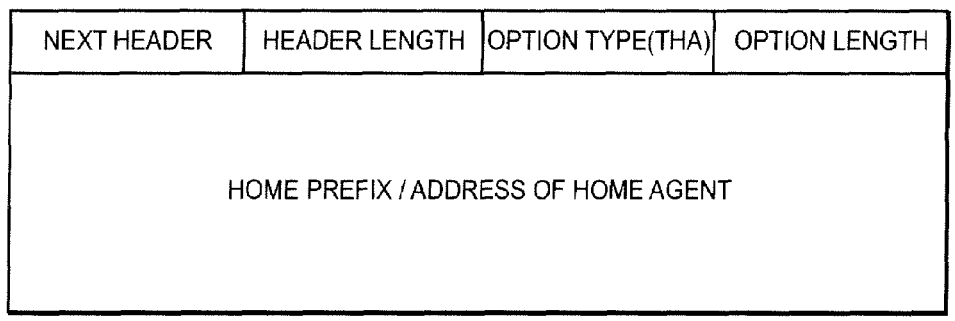
FIG. 6 illustrates a second exemplary THA option added to an encapsulated packet by a HA in the second embodiment of the present invention.

FIG. 6 illustrates another exemplary THA option added to an encapsulated packet by a HA in the second embodiment of the present invention. In addition to the configuration of FIG. 5, an extension header of FIG. 6 may include, in the THA option, a home prefix or a HA address of a home network to which the HA adding this THA option belongs. Upon receipt of an encapsulated packet with this THA option added thereto, the HA designates a care-of address that does not include the home prefix or the prefix of the HA address as the next transfer destination, so that reflection of a packet can be avoided. Further, the THA option effectively may include a destination address of an inner packet inserted therein.

The following describes an exemplary specific operation in the second embodiment of the present invention, while referring to the network configuration of FIG. 1. In the following description, it is assumed that the MN 10 performs communication using a CN 16 and HoA1.

Figure 7:
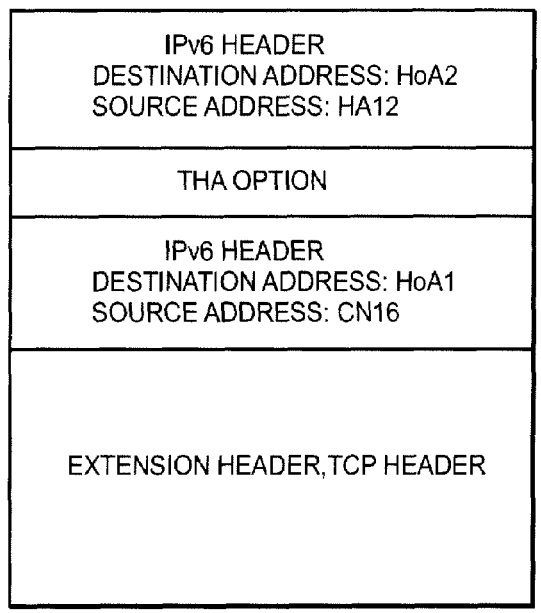
FIG. 7 illustrates an exemplary encapsulated packet with a THA option added thereto by HA in the second embodiment of the present invention.

When receiving as a proxy a packet addressed to HoA1 transmitted by the CN 16, the HA 12 selects HoA2 as a transfer destination address from care-of addresses (CoA, HoA2) associated with HoA1 as a normal mobile IPv6 processing. At this time, the HA 12 adds an outer header including HoA2 as a destination, further adds a THA option as an extension header, and transmits an encapsulated packet. The encapsulated packet transmitted at this time has a configuration as illustrated in FIG. 7.

The encapsulated packet transmitted from the HA 12 is received by the HA 14 as a proxy, the HA 14 existing in the home network 13. During the reception processing, the HA 14 recognizes that the THA option is added as the extension header of the outer header of this encapsulated packet, so that, when selecting a transfer destination address, the HA 14 selects a CoA as an address that does not include the same prefix instead of HoA1 including the same prefix as that of the source address of the outer header. Thereby, the HA 14 generates the encapsulated packet including CoA as a destination and transmits the same, so that the encapsulated packet can be delivered to the MN 10 without the occurrence of reflection. Alternatively, the HA 14 may refer to the destination address of the inner header so as not to select HoA1 that is the same address as this destination address, thus avoiding reflection as well.

In the case where a site multi-home advertises a new prefix in the home network 11, the MN 11 can keep a further effective home address (HoA3) in the home network 11. Thereby, the MN 10 can use HoA3 in addition to HoA1, where both of HoA1 and HoA3 can be registered as the care-of addresses associated with HoA2.

Under such conditions, upon receipt of the encapsulated packet with the above-stated THA option added thereto, if the source address of the outer header has the same prefix as that of HoA1 (or HoA3), the HA 14 can remove HoA1 (or HoA3) from selection targets. However, there still remains a possibility that HoA3 (or HoA1) can be selected as a care-of address for transfer destination. Note here that when a packet with HoA1 (or HoA3) set as a source address is transferred to HoA3 (or HoA1), a packet transmitted from the HA 12 will be transferred to the HA 12 again, which means the occurrence of reflection.

Figure 8:
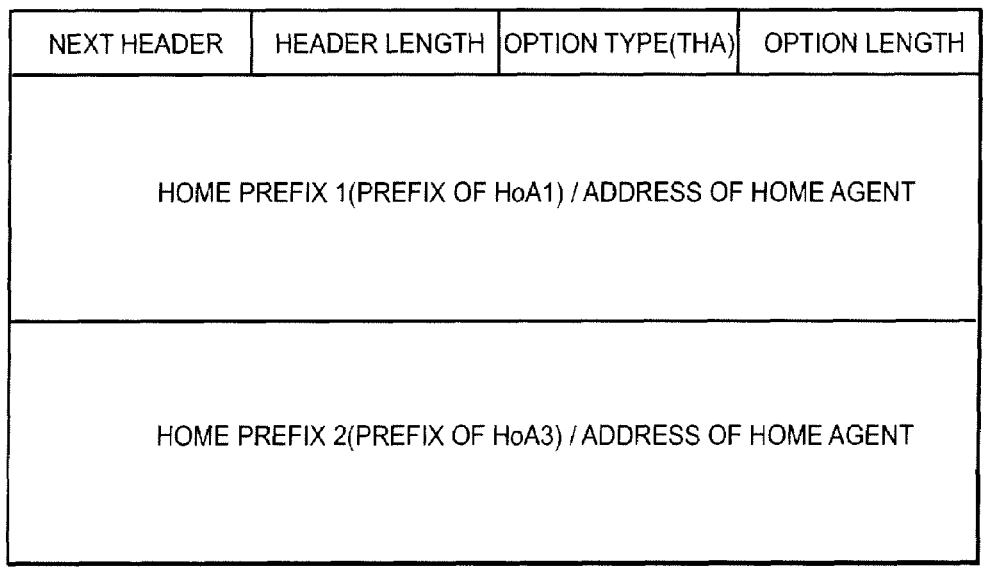
FIG. 8 illustrates a third exemplary THA option added to an encapsulated packet by a HA in the second embodiment of the present invention.

In order to prevent such a problem, as shown in FIG. 8, the HA 12 can let the THA option contain information (e.g., all home prefixes or HA addresses that the HA manages) of a plurality of home prefixes managed by a site multi-home. In this case, the home prefixes in the THA option can be dealt with in a similar manner to the prefix of the source address of the outer header, and therefore the HA 14 does not select as a care-of address an address having the same prefix as the home prefixes in the THA option. As a result, the occurrence of reflection can be avoided.

Figure 9:
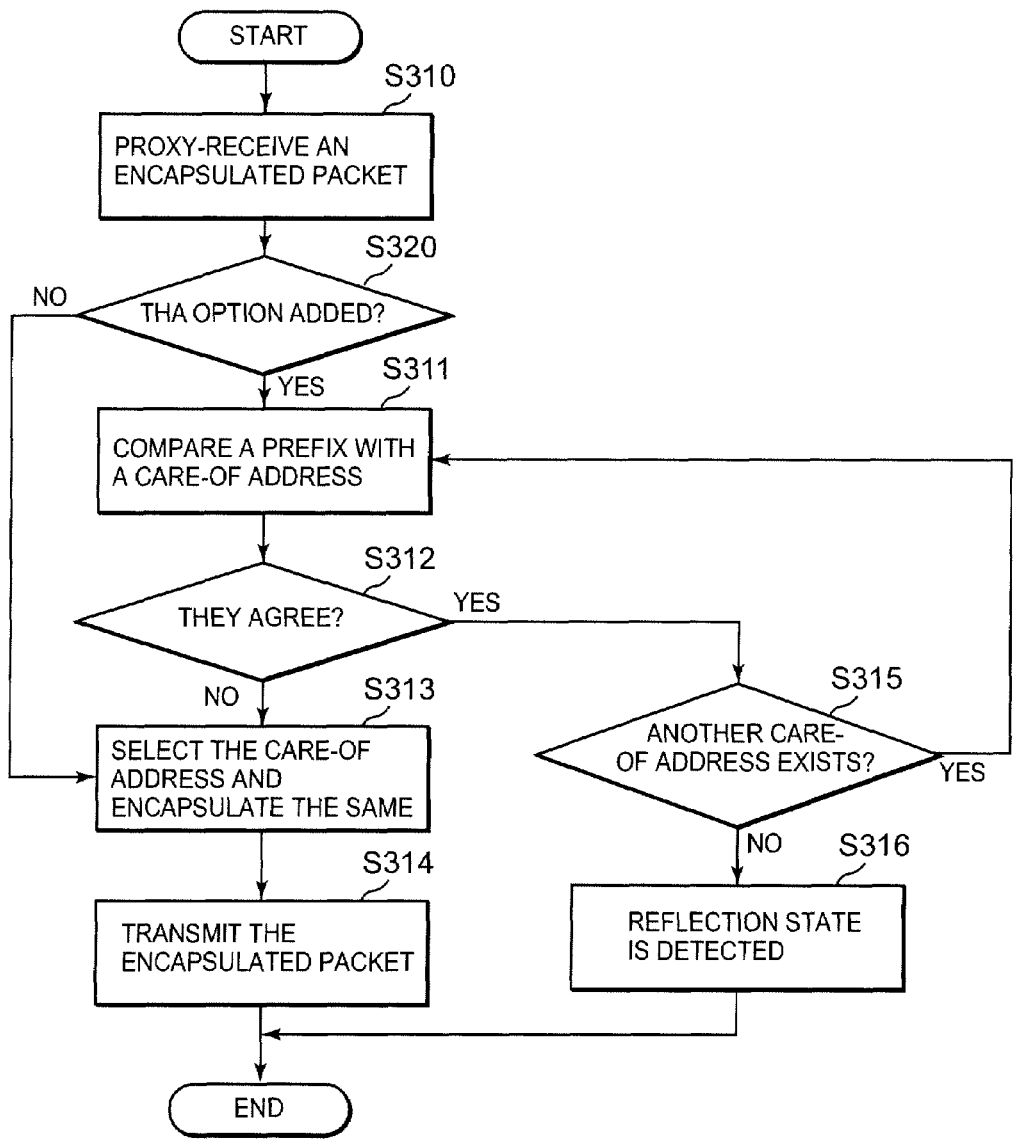
FIG. 9 is a flowchart showing an exemplary operation of a HA in the second embodiment of the present invention.

The following describes an exemplary operation of the HAs 12 and 14 in the second embodiment of the present invention. FIG. 9 is a flowchart showing an exemplary operation of a HA in the second embodiment of the present invention.

In FIG. 9, when receiving as a proxy an encapsulated packet addressed to HoA of a MN 10 (Step S310), the HA (HA12, 14 of FIG. 1) firstly checks whether the encapsulated packet includes a THA option added thereto or not (Step S320). If the encapsulated packet does not include a THA packet added thereto, this encapsulated packet is not encapsulated by a HA, and therefore any care-of address selected as a transfer destination address will not generate reflection. Therefore, the process goes to Step S313, where the HA generates an encapsulated packet including any care-of address as the transfer destination address for transfer.

On the other hand, if the encapsulated packet includes a THA packet added thereto, the same processing as Step S311 or later of FIG. 3 is performed, whereby reflection can be avoided or a reflection state can be detected.

The technique according to the second embodiment of the present invention can function effectively in another exemplary network configuration of FIG. 17 as well. In FIG. 17, a MN 10 has two interfaces (IF 20 and IF 21), which are connected with a local network 515 and a local network 516, respectively, to which a network-based mobility protocol (e.g., Proxy Mobile IP (PMIP)) is provided. In the local networks 515 and 516, a PMA 518 and a PMA 519 exist respectively as proxy nodes (e.g., Proxy Mobile Agent (PMA)) that control movement as a proxy of the MN 10, thus exchanging a message between the HA 12 and the HA 14 managing the MN 10 according to the mobility protocol.

To the MN 10, HoA1 is assigned from the HA12, and HoA2 is assigned from the HA14. The PMA 518 associates its own address as a care-of address with HoA1, which is registered at the HA 12. Whereas, the PMA 519 associates its own address as a care-of address with HoA2, which is registered at the HA 14.

In such a configuration, when the MN 10 associates HoA2 as a care-of address with HoA1 and registers the same at the HA 12, and associates HoA1 as a care-of address with HoA2 and registers the same at the HA 14 in order to obtain mobility between both of the IFs 20 and 21, reflection may occur between the HAs 12 and 14. In this case, the technique described in the second embodiment of the present invention allows such reflection to be avoided.

Similarly in the case where, as shown in FIG. 18, the configuration includes an foreign network 517 to which a network-based mobility protocol is not provided instead of the local network 516 of FIG. 17 to which a network-based mobility protocol is provided, when HoA2 is associated as a care-of address with HoA1, which is then registered at the HA 12, and HoA1 is associated as a care-of address with HoA2, which is then registered at the HA 14, reflection may occur between the HAs 12 and 14. In this case also, the technique described in the second embodiment of the present invention allows such reflection to be avoided.

As described above, according to the second embodiment of the present invention, when a packet that a HA receives as a proxy is encapsulated and transferred, information indicating that the encapsulation is performed by the HA is added to the encapsulated packet. Thereby, the HA receiving the encapsulated packet as a proxy can distinguish a packet encapsulated by the HA from other encapsulated packets. Then, the HA can transfer a packet so as to avoid reflection or can detect a reflection state only for the packet encapsulated by the HA.

Third Embodiment

Figure 10:
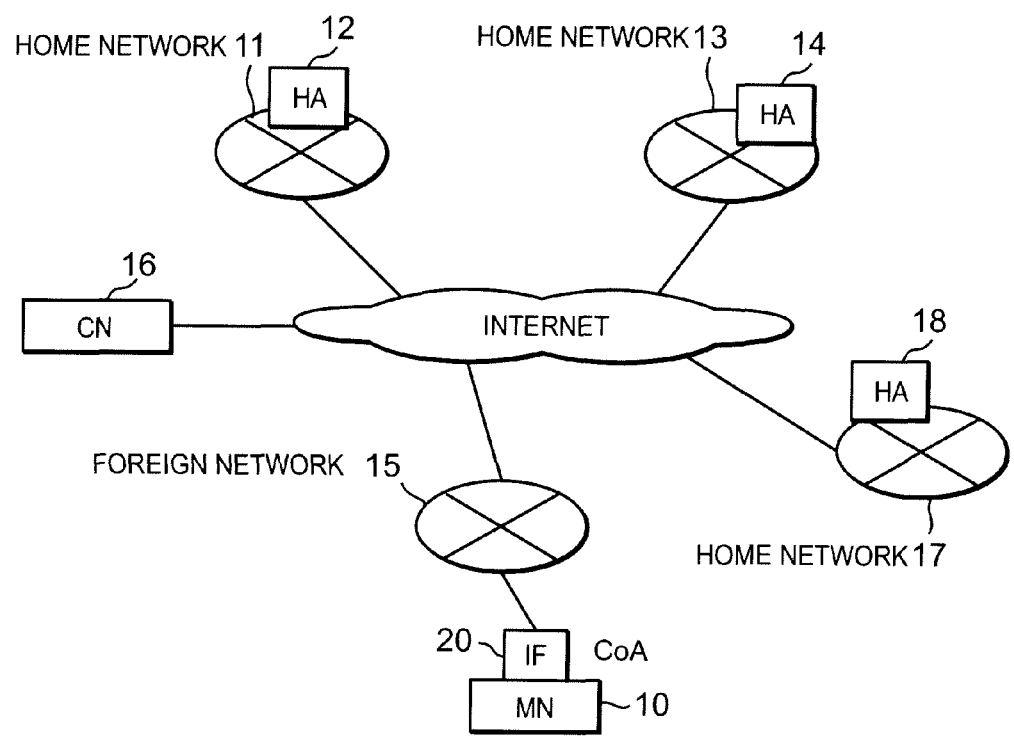
FIG. 10 illustrates an exemplary network configuration in the third embodiment of the present invention.

Next, the third embodiment of the present invention will be described below. FIG. 10 illustrates an exemplary network configuration in the third embodiment of the present invention. In FIG. 10, a MN 10 can use a HA 12 existing in a home network 11 as its own home agent, a HA 14 existing in a home network 13, and a HA 18 existing in a home network 17. The MN 10 has a home address (HoA1) assigned thereto by the home network 11 where the HA 12 manages the HoA1. The MN 10 further has a home address (HoA2) assigned thereto by the home network 13 where the HA 14 manages the HoA2. The MN 10 further has a home address (HoA3) assigned thereto by the home network 17 where the HA 18 manages the HoA3.

The MN 10 connects with a foreign network 15, and a CoA acquired from the foreign network 15 is assigned to an interface (IF) 20. For the HA 12, the MN 10 has a binding cache registered therein where HoA1 and CoA are associated therewith. For the HA 14, the MN 10 has a binding cache registered therein where HoA2 and CoA are associated therewith and a binding cache registered therein where HoA2 and HoA3 are associated therewith. Further, for the HA 18, the MN 10 has a binding cache registered therein where HoA3 and CoA are associated therewith and a binding cache registered therein where HoA3 and HoA2 are associated therewith. Thereby, a packet addressed to HoA1 of the MN 10 transmitted from the CN 16 is received by the HA 12 as a proxy, which is then encapsulated and addressed to CoA for transfer. A packet addressed to HoA2 of the MN 10 transmitted from the CN 16 is received by the HA 14 as a proxy, which is then encapsulated and addressed to CoA or HoA3 for transfer. A packet addressed to HoA3 of the MN 10 is received by the HA 18 as a proxy, which is then encapsulated and addressed to CoA or HoA2 for transfer. FIG. 11 schematically illustrates the binding information of the MN 10 held by each of the HAs 12, 14 and 18.

Figure 12:
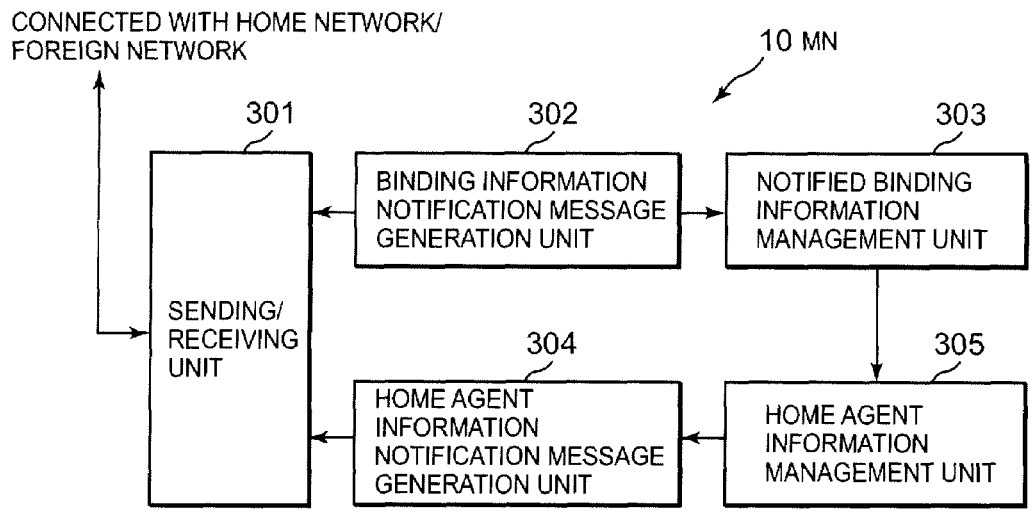
FIG. 12 illustrates an exemplary configuration of a MN in the third embodiment of the present invention.

The following describes the configuration of the MN 10 in the third embodiment of the present invention. FIG. 12 illustrates an exemplary configuration of the MN 10 in the third embodiment of the present invention. In FIG. 12, the MN 10 includes a sending/receiving unit 301, a binding information notification message generation unit 302, a notified binding information management unit 303, a home agent information notification message generation unit 304, and a home agent information management unit 305. Although the MN 10 has various other functions including a data packet processing unit that processes a data packet exchanged with the CN 16, for example, the illustration thereof has been omitted in FIG. 12.

The sending/receiving unit 301 has a packet sending/receiving function for enabling communication with any communication node in a network (e.g., the foreign network 15 of FIG. 10) connected with the MN 10, any communication node (e.g., the HAs 12, 14, and 18 of FIG. 10) in the home networks 11, 13, and 17 of the MN 10, and any other communication nodes (e.g., the CN 16 of FIG. 10) existing in any other networks. The sending/receiving unit 101 also includes the function of the interface 20 for wireless connection illustrated in FIG. 10, for example.

The binding information notification message generation unit 302 has a function of generating a binding information notification message that is for registering binding information illustrated in FIG. 11, for example, in each corresponding HA 12, 14, or 18. The binding information notification message generated by the binding information notification message generation unit 102 is transmitted to each corresponding HA 12, 14, or 18 via the sending/receiving unit 301.

In the case where the binding information to be registered includes binding information that uses a home address managed by another home agent as a care-of address, the binding information notification message generation unit 302 adds THA addition request information to the binding information. When a packet is transferred, if the binding information selected as a transfer destination includes THA addition request information added thereto, then the HA adds a THA option to an encapsulated packet and transfers the same. Thereby, reflection with the HA for transfer destination can be avoided.

Figure 19:
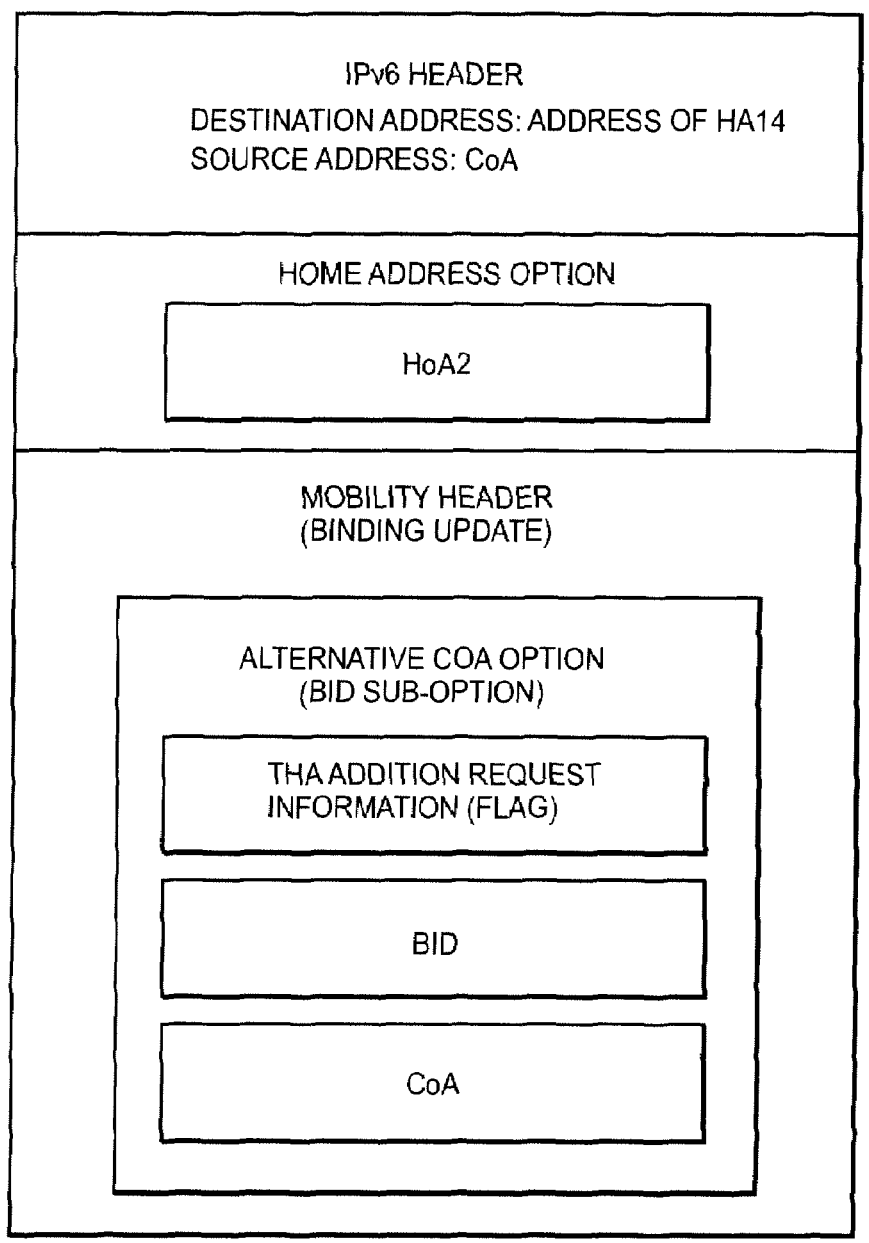
FIG. 19 illustrates an exemplary binding information notification message including THA addition request information that is generated and transmitted by a MN in the third embodiment of the present invention.

FIG. 19 illustrates an exemplary binding information notification message including THA addition request information that is generated by the binding information notification message generation unit 302. In the binding information notification message of FIG. 19, the THA addition request information is inserted in a binding update message transmitted when the MN 10 registers its own CoA with respect to HA 14. The THA addition request information can be implemented as a flag of an alternate CoA option or BID sub-option or as a flag of a mobility header.

The THA addition request information may be included not only in the binding information notification message but also in a message that is transmitted for the registration of flow information or in a home agent information notification message generated by the home agent information notification message generation unit 304. In such a message, not only a care-of address but also a Binding Unique ID (BID) associated with each piece of binding information can be used as information to specify the binding information to which the THA binding information notification message is added.

The notified binding information management unit 303 has a function of managing care-of addresses associated with home addresses (HoA1, HoA2, and HoA3) managed by the HAs 12, 14 and 18, respectively, and the notified binding information management unit 303 keeps binding information registered for the HAs 12, 14, and 18 (e.g., binding information of FIG. 11).

The home agent information notification message generation unit 304 has a function of generating a massage including information (home agent information) on a home agent passed from the home agent information management unit 305. The home agent information notification message generated by the home agent information notification message generation unit 304 is transmitted to each home agent through the sending/receiving unit 301, whereby other home agents can be notified of information on a specific home agent managing the address of the MN 10.

Further, the home agent information management unit 305 manages home agent information (e.g., address of a home agent, or Domain Name System (DNS) name thereof) on each home agent available from the MN 10, and instructs the home agent information notification message generation unit 304 to generate a home agent information notification message that is for notifying each home agent of information on other home agents.

Moreover, the home agent information management unit 305 checks the information managed by the notified binding information management unit 303 to find a home agent to which home agent information is notified for avoiding reflection. Thereby, it is possible to notify a specific home agent only of the information on other home agents.

For instance, in the case where the notified binding information management unit 303 of the MN 10 manages binding information indicating that HoA3 of the home network 17 is registered as a CoA associated with HoA2 and HoA2 of the home network 13 is registered as a CoA associated with HoA3, the home agent information management unit 305 determines that the HAs 14 and 18 are to be notified of the each other's home agent information.

On the other hand, since the HA 12 is not registered so that reflection occurs (i.e., HoA1 managed by the HA 12 is associated with CoA acquired from the foreign network 15 only), it is judged that there is no need to notify the HA 12 of the home agent information. Thereby, the home agent information management unit 305 can judge home agents to which the home agent information is to be notified, and can notify the home agents of the home agent information, thus making it possible to avoid unnecessary message transmission. Alternatively, the MN 10 may not judge whether or not to notify the home agent information, but may notify all of the HAs 12, 14, and 18 of the home agent information on other HAs' home agents.

In the case where a HA corresponding to the HA in the third embodiment of the present invention described later and a HA not corresponding to such a HA coexist, the HA corresponding to the acquisition of home agent information is detected by using technology allowing the information on HAs to be obtained such as Dynamic Home Agent Address Discovery, Mobile Prefix Discovery specified by mobile IPv6, for example, and the corresponding HA only may be notified of the home agent information, thus making it possible to avoid unnecessary message transmission. In this case, it is preferable that information indicating whether a HA supports a function of the HA in the third embodiment described later or not is included in a home agent address discovery reply message or a mobile prefix advertisement message, for example.

As described above referring to FIG. 12, the MN 10 in the third embodiment of the present invention is configured so that each of a plurality of HAs can be notified of home agent information on other HAs in order to avoid reflection between HAs. As the home agent information of HAs, an address of a HA, a DNS name allowing an address of a HA to be specified may be used.

Figure 13:
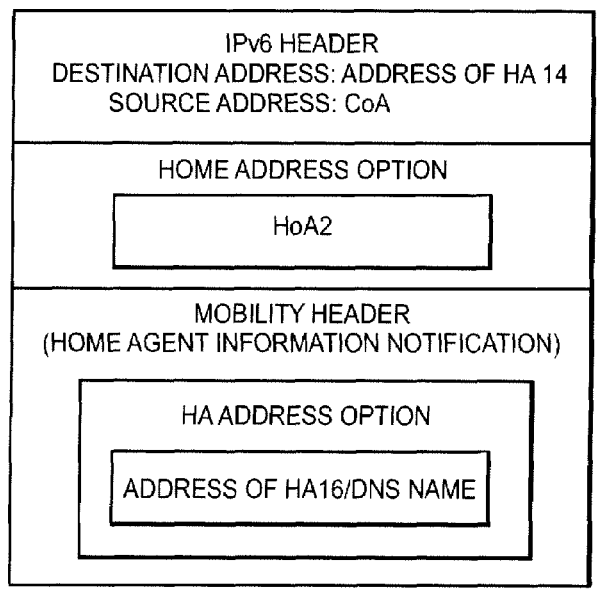
FIG. 13 illustrates an exemplary home agent information notification message that is generated and transmitted by a MN in the third embodiment of the present invention.

FIG. 13 illustrates an exemplary home agent information notification message that is for notifying the HA 14 of home agent information on the HA 16, which is generated by the home agent information notification message generation unit 304. In the home agent information notification message of FIG. 13, a mobility header is used for inserting the home agent information therein, and the mobility header includes a HA address option including home agent information such as an address, a DNS name or the like of the HA 16.

Figure 14:
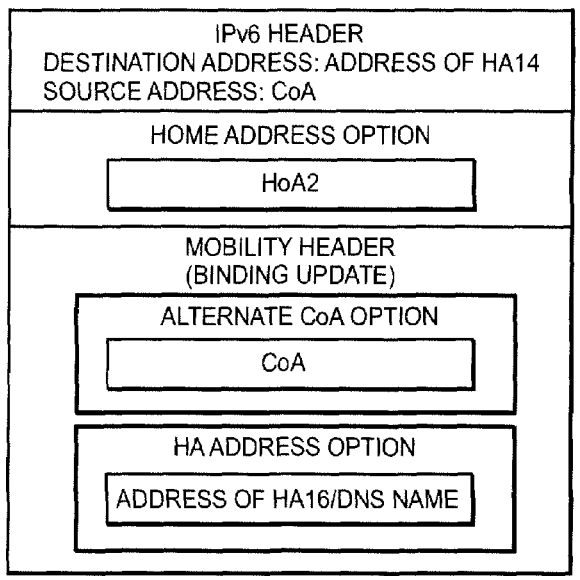
FIG. 14 illustrates another exemplary home agent information notification message that is generated and transmitted by a MN in the third embodiment of the present invention.

FIG. 14 illustrates another exemplary home agent information notification message that is for notifying the HA 14 of home agent information on the HA 16, which is generated by the home agent information notification message generation unit 304. In the home agent information notification message of FIG. 14, a HA address option having home agent information on the HA 16 is included in a binding update message transmitted when the MN 10 registers its own CoA with respect to the HA 14.

Figure 15:
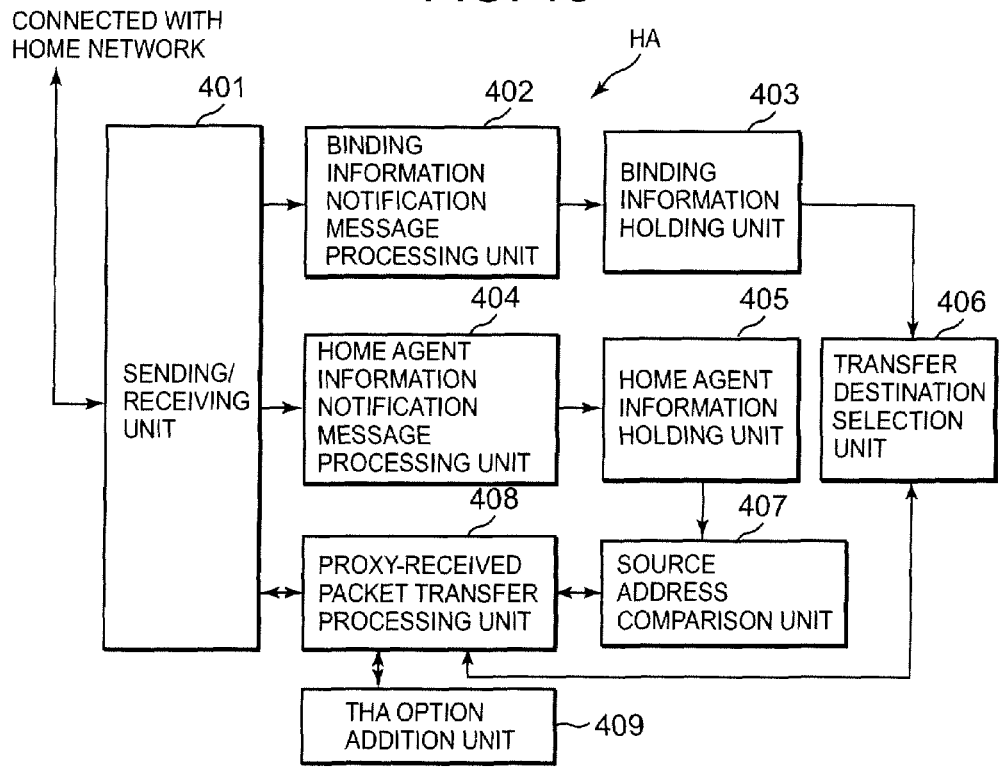
FIG. 15 illustrates an exemplary configuration of a HA in the third embodiment of the present invention.
Figure 16:
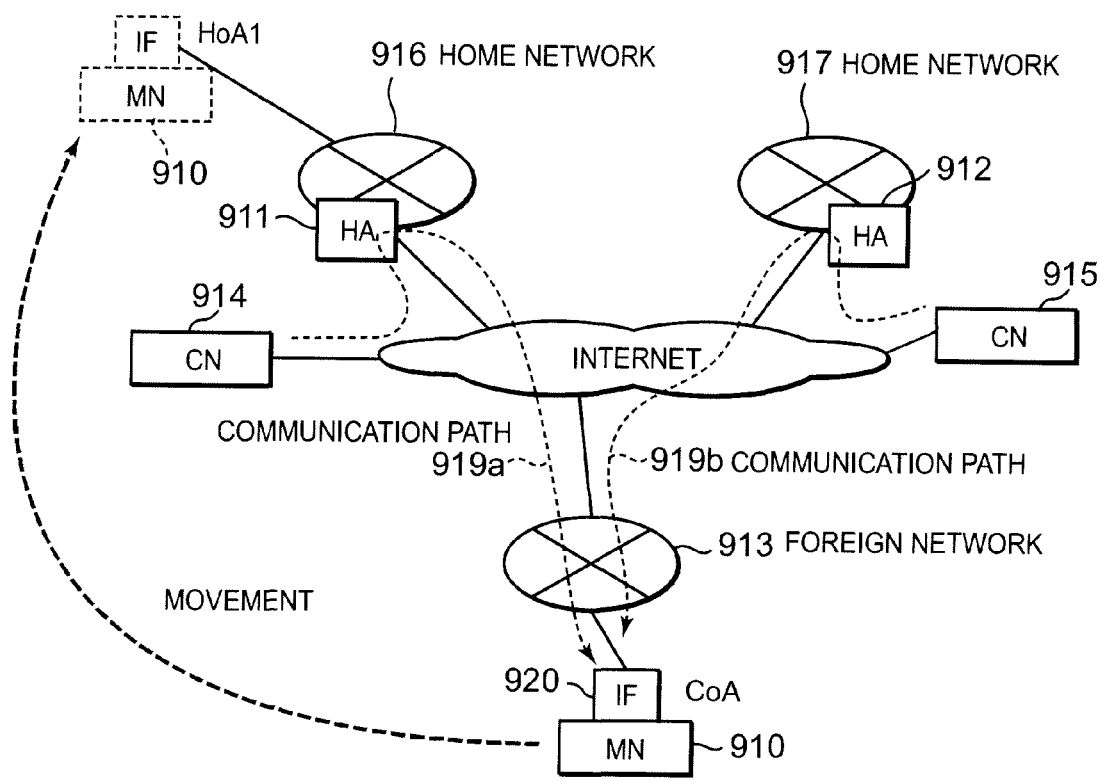
FIG. 16 illustrates an exemplary network configuration including a MN 10 to which a plurality of HoAs are assigned in the conventional technique.

The following describes the configuration of the HAs 12, 14 and 18 in the third embodiment of the present invention. FIG. 15 illustrates an exemplary configuration of a HA (HA12, 14 or 18) in the third embodiment of the present invention. In FIG. 15, the HA includes a sending/receiving unit 401, a binding information notification message processing unit 402, a binding information holding unit 403, a home agent information notification message processing unit 404, a home agent information holding unit 405, a transfer destination selection unit 406, a source address comparison unit 407, a proxy-received packet transfer processing unit 408, and a THA option addition unit 409. Although the HAs have various other functions, the illustration thereof has been omitted in FIG. 15.

The sending/receiving unit 401 has a packet sending/receiving function for enabling communication with any communication node in a network (e.g., the home networks 11, 13 and 17 of FIG. 1) connected with the HAs 12, 14 and 18, the MN 10 connected with the foreign network 15 (the MN 10 belonging to the home networks 11, 13 and 17 where the HAs 12, 14 and 18 exist), and any other communication nodes connected with any other networks.

The binding information notification message processing unit 402 processes a binding information notification message sent from the MN 10 to acquire binding information on the MN 10 included in the message and instructs to store the same in the binding information holding unit 403.

The binding information holding unit 403 stores the binding information passed from the binding information notification message processing unit 402.

The home agent information notification message processing unit 404 processes a home agent information notification message sent from the MN 10 to acquire home agent information included in the message and instructs to store the same in the home agent information holding unit 405.

The home agent information holding unit 405 stores the home agent information passed from the home agent information notification message processing unit 404. It is desirable that the home agent information holding unit 405 stores and manages home agent information including an address, a DNS name and the like of a home agent together with the identification information on the MN 10.

The transfer destination selection unit 406 receives, from the proxy-received packet transfer processing unit 408, a home address of the MN 10 as a selection target and home agent information corresponding to the MN 10 (e.g., a prefix of the address of the home agent). Further, upon being requested to select a transfer destination address, the transfer destination selection unit 406 checks the binding information held in the binding information holding unit 403 to find a binding cache corresponding to the notified home address of the MN 10, and selects an address having a prefix different from the prefix included in the notified home agent information as a care-of address. If an address having a prefix different from the prefix included in the notified home agent information cannot be found, the occurrence of reflection is detected.

Upon being requested from the proxy-received packet transfer processing unit 408 to select a transfer destination address because there is no corresponding home agent information, if the selected transfer address includes THA addition request information added thereto, the transfer destination selection unit 406 passes the THA addition request information together with the transfer destination address to the proxy-received packet transfer processing unit 408. Herein, even when the corresponding home agent information is passed from the proxy-received packet transfer processing unit 408, if an address having the same prefix as that included in the notified home agent information has to be selected, then the transfer destination selection unit 406 passes the THA addition request information together with the transfer destination address to the proxy-received packet transfer processing unit 408.

The source address comparison unit 407 acquires, from the home agent information holding unit 405, home agent information (e.g., a prefix of an address of a home agent) corresponding to an address (home address of the MN 10) set as the destination address of the packet notified from the proxy-received packet transfer processing unit 408, and compares the same with an address set as a source address of the packet. Then the source address comparison unit 407 checks as to whether an address agreeing with the source address exists in the home agent information or not, and passes a result of the checking (if agreeing address exists, information including the prefix of the agreeing home agent's address) to the proxy-received packet transfer processing unit 408.

The proxy-received packet transfer processing unit 408 passes a packet received as a proxy to the source address comparison unit 407, and instructs the source address comparison unit 407 to compare the source address thereof with the home agent information. If the result passed from the source address comparison unit 407 indicates the existence of the agreeing home agent information, the proxy-received packet transfer processing unit 408 passes the prefix of the address of the agreeing home agent together with the home address as the selection target to the transfer destination selection unit 406, and instructs the transfer destination selection unit 406 to select an address having a prefix different from the prefix as a care-of address.

The proxy-received packet transfer processing unit 408 checks an extension header added to a header portion of the proxy-received encapsulated packet. If a THA option is added thereto, the proxy-received packet transfer processing unit 408 may pass the proxy-received packet to the source address comparison unit 407, and instruct the source address comparison unit 407 to compare the source address thereof with the home agent information. Herein, as shown in FIG. 6, the THA option may include a home prefix or a home agent address instead of the source address of the outer header. In the case where information including a prefix of the home agent is included in the THA option, the proxy-received packet transfer processing unit 408 may pass the information including the prefix of the home agent to the transfer destination selection unit 406 and may instruct the transfer destination selection unit 406 to select a care-of address other than an address including the same prefix, instead of issuing an instruction to the source address comparison unit 408.

If the result from the source address comparison unit 407 indicates the existence of the agreeing home agent information, the proxy-received packet transfer processing unit 408 may judge that the address set as a destination address of an inner packet is the home address of the MN 10 when issuing an instruction to the transfer destination selection unit 406, and may pass the destination address of the inner packet together with the home address as the selection target and may instruct the transfer destination selection unit 406 to select an address different from those addresses as a care-of address.

The proxy-received packet transfer processing unit 408, upon receipt of the THA addition request information together with the transfer destination address from the transfer destination selection unit 406, instructs the THA option addition unit 409 to add a THA option to the transfer packet.

Herein, in the case where the existence of the THA option makes it possible to recognize that such an encapsulated packet is encapsulated by another HA, the proxy-received packet transfer processing unit 408 may refer to a destination address of an inner packet, further recognize that the destination address of the inner packet is the home address of the MN 10 managed by the HA performing the encapsulation, pass the address to the transfer destination selection unit 205 so as to request to select an address other than the address as a care-of address.

The THA option addition unit 409 has a function of, in response to the instruction from the proxy-received packet transfer processing unit 408, adding a THA option as an option to be added to an outer header (encapsulated header) of the packet subjected to encapsulation and to be transferred. Note here that, in the third embodiment of the present invention, it is not always necessary to add a THA option to an encapsulated packet. However, the addition of a THA option makes it possible to specify that the packet is encapsulated by a HA, thus allowing the processing to be performed only for a packet with a possibility of reflection.

In the case where the THA option includes a home prefix of the HA that adds the THA option or an address of the HA inserted therein, the HA may use the home prefix of the HA or the address of the HA in the THA option instead of the source address of the encapsulated packet or the destination address of the inner packet, so that an address having a prefix different from the home prefix of the HA or the prefix of the address of the HA in the THA option may be selected as a transfer destination address.

As described above referring to FIG. 15, the HA in the third embodiment of the present invention is configured so as to, when a proxy-received packet is transferred, refer to home agent information on other HAs notified from a MN, and not to select a care-of address having the same prefix as that of the source address of the proxy-received packet (or the same care-of address as the destination address of the inner packet of the encapsulated packet) as a transfer destination address. With this configuration, it becomes possible to avoid the transfer (reflection) letting a packet back to a HA as a source (transfer sender) of the packet.

Note here that the HA in the third embodiment of the present invention may be configured so as to transmit a message that requests, to the MN, the notification of home agent information. Further, as a provider of the home agent information, not only the MN but also any information providing server existing in a network may be used. In this case, the information providing server preferably provides home agent information concerning a specific MN to a HA at any timing or in response to a request from the HA.

The following describes an exemplary specific operation in the third embodiment of the present invention, referring to the network configuration of FIG. 10. In the following description, it is assumed that the MN 10 performs communication using a CN 16 and HoA2.

The MN 10 notifies the HA 14 of home agent information on the HA 18, and further notifies the HA 18 of home agent information on the HA 14. As described above, the MN 10 refers to the binding information stored in the notified binding information management unit 303, thus detecting the possibility that reflection occurs between the HAs 14 and 18, and making a decision such that the HA 14 is notified of the home agent information on the HA 18 and the HA 18 is notified of the home agent information on the HA 14.

When receiving a packet addressed to HoA2 transmitted by the CN 16 as a proxy, the HA 14 selects HoA3 as a transfer destination address from care-of addresses (CoA, HoA3) associated with HoA2, and transfers the packet using an encapsulated packet addressed to HoA3.

The encapsulated packet transmitted from the HA 14 is received by the HA 18 existing in the home network 17 as a proxy. When receiving this encapsulated packet as a proxy, the HA 18 refers to the source address of the encapsulated packet and the home agent information kept by itself so as to detect that the source address of the encapsulated packet is equal to the address of the HA 14 in the home agent information kept by itself. Thereby, the HA 14 can recognize that reflection will occur when HoA2 is selected as the next transfer destination, and can select an address other than HoA2 (i.e., CoA) as a transfer destination address of the packet. As a result, the packet transmitted by the CN 16 can be delivered to the MN 10 without the occurrence of reflection.

The use of the home agent information allows the occurrence of reflection to be avoided at an earlier stage. For instance, when receiving a packet addressed to HoA2 as a proxy, the HA 14 can recognize that, if HoA3 is selected as a care-of address for packet transfer destination, then the packet will be transferred to the HA 18 included in the home agent information, which means the possibility of reflection. In this case, it is desirable that the HA 14 selects, as a care-of address, CoA and not HoA3. In this way, the home agent information is referred to, whereby the HA 14 controls so that a packet will not be transferred to another HA (HA 18), thus avoiding the occurrence of reflection. Further, also in the case where another HA (HA 18) is a normal home agent (home agent that cannot select a transfer destination address so as to avoid the reflection), the occurrence of reflection can be prevented.

The THA addition request information in the third embodiment of the present invention is applicable to the MN 10, the HA 12 and the HA 14 in the second embodiment of the present invention as well.

The technique according to the third embodiment of the present invention can function effectively in another exemplary network configuration of FIG. 17 as well. In FIG. 17, a MN 10 has two interfaces (IF 20 and IF 21), which are connected with a local network 515 and a local network 516, respectively, to which a network-based mobility protocol (e.g., Proxy Mobile IP (PMIP)) is provided. In the local networks 515 and 516, a PMA 518 and a PMA 519 exist respectively as proxy nodes (e.g., Proxy Mobile Agent (PMA)) that control movement as a proxy of the MN 10, thus exchanging a message between the HA 12 and the HA 14 managing the MN 10 according to the mobility protocol.

To the MN 10, HoA1 is assigned from the HA12, and HoA2 is assigned from the HA14. The PMA 518 associates its own address as a care-of address with HoA1, which is registered at the HA 12. Whereas, the PMA 519 associates its own address as a care-of address with HoA2, which is registered at the HA 14.

In such a configuration, when the MN 10 associates HoA2 as a care-of address with HoA1 and registers the same at the HA 12, and associates HoA1 as a care-of address with HoA2 and registers the same at the HA 14 in order to obtain mobility between both of the IFs 20 and 21, reflection may occur between the HAs 12 and 14. In this case, the technique described in the third embodiment of the present invention allows such reflection to be avoided.

In this case, the home agent information may be transmitted by the MN 10 or by the PMA 518 and the PMA 519 as the proxy nodes. Further, the PMA 518 may transmit the home agent information not only to the HA 12 but also to the HA 14, and the PMA 519 may transmit the home agent information not only to the HA 14 but also to the HA 12. The home agent information can be acquired from the MN 10 or from an information management server in a network.

Similarly in the case where, as shown in FIG. 18, the configuration includes a foreign network 517 to which a network-based mobility protocol is not provided instead of the local network 516 of FIG. 17 to which a network-based mobility protocol is provided, when HoA2 is associated as a care-of address with HoA1, which is then registered at the HA 12, and HoA1 is associated as a care-of address with HoA2, which is then registered at the HA 14, reflection may occur between the HAs 12 and 14. In this case also, the technique described in the third embodiment of the present invention allows such reflection to be avoided.

In this case, the home agent information may be transmitted by the MN 10 or by the PMA 518 as the proxy node. Further, the PMA 518 may transmit the home agent information not only to the HA 12 but also to the HA 14. The home agent information can be acquired from the MN 10 or from an information management server in a network.

As described above, according to the third embodiment of the present invention, a HA can understand home agent information on another HA that the MN uses. Then, when en capsulated packet is transferred, the HA can compare the home agent information on another HA with the source address of the encapsulated packet or a destination address of an inner packet, and can set so that the transfer destination address of the packet is not brought back to the transfer sender (i.e., so as not to set a care-of address including the same prefix as that of the address of another HA). By referring to the home agent information, the HA can control so that the proxy-received packet will not be transferred to another HA, thus preventing the occurrence of reflection.

In the present invention, the techniques according to the first to third embodiments of the present invention have been described individually. However, the techniques according to the first to third embodiments of the present invention can be combined freely to implement the present invention.

The respective functional blocks used for the above description of embodiments of the present invention can be typically implemented by a Large Scale Integration (LSI) as an integrated circuit. They may be individually made into one chip, or may be made into one chip so as to include a part or the whole thereof. The LSI referred to herein may be called an Integrated Circuit (IC), a system LSI, a super LSI, or an ultra LSI depending on the degree of integration.

The technique for implementing the integrated circuit is not limited to LSI, but may be implemented by a dedicated circuit or a general-purpose processor. Also, a Field Programmable Gate Array (FPGA) enabling programming after the LSI fabrication, or a re-configurable processor that can be reconfigured concerning the connection and configuration of a circuit cell within a LSI may be used.

Moreover, if any technique is developed that can replace the LSI by the development in semiconductor technology or using derivative different technology, the integration of functional blocks can be naturally performed using such technology. For instance, biotechnology may be applied thereto.

INDUSTRIAL APPLICABILITY

The present invention has an effect of, when a mobile node can use a plurality of home agents, preventing the occurrence of reflection of a packet between two home agents among the plurality of home agents by the processing on a network side mainly. The present invention is applicable to packet transfer technique and address management technique, and particularly applicable to packet transfer technique and address management technique in mobile IPv6.

The invention claimed is:

1. A packet transfer control device that controls packet transfer in a first home agent belonging to a first home network, comprising:
    binding information management means that manages an address of a mobile node having, in addition to a first home address assigned from the first home network, a second home address assigned from a second home network different from the first home network, and holds binding information in which at least the second home address is associated with as a care-of address of the first home address; and
    transfer destination selection control means that, when an encapsulated packet including the first home address as a destination address is received from a second home agent belonging to the second home network, controls so that the second home address is not selected as a transfer destination address of the encapsulated packet when the encapsulated packet is to be transferred.

2. The packet transfer control device according to claim 1, wherein the transfer destination selection control means is so arranged to refer to a source address of an outer header of the encapsulated packet or a destination address of an inner header of the encapsulated packet, and not to select, as the transfer destination address, an address having a same prefix as a prefix of the source address or a same address as the destination address from the care-of address in the binding information.

3. The packet transfer control device according to claim 1, further comprising:
    home agent information reception means that receives, from the mobile node, home agent information at least comprising an address of the second home agent or information that specifies the address of the second home agent; and
    home agent information holding means that holds the home agent information received by the home agent information reception means,
    wherein the transfer destination selection control means is so arranged to refer to a source address of an outer header of the encapsulated packet, and when an address of the second home agent obtained from the information held by the home agent information holding means agrees with the source address, not to select as the transfer destination address an address having a same prefix as a prefix of the source address from the care-of address in the binding information.

4. The packet transfer control device according to claim 1, comprising:
    option information confirmation means that confirms whether option information is added to the encapsulated packet or not, the option information indicating encapsulation by a home agent,
    and being so arranged that only when the option information confirmation means confirms that the option information is added to the encapsulated packet, the transfer destination selection control means does not select the second home address as the transfer destination address.

5. The packet transfer control device according to claim 1, comprising:
    encapsulation means that, when the encapsulated packet is transferred, further encapsulates the encapsulated packet using an outer header to which option information is added, the option information indicating encapsulation by a home agent.

6. A mobile node with a first home address assigned by a first home network as well as a second home address assigned by a second home network different from the first home network, comprising:
    first binding information notification means that notifies a first home agent belonging to the first home network of binding information in which at least the second home address is associated with as a care-of address of the first home address;
    second binding information notification means that notifies a second home agent belonging to the second home network of binding information in which at least the first home address is associated with as a care-of address of the second home address;
    first home agent information notification means that notifies the first home agent of home agent information, the home agent information at least including an address of the second home agent or information that specifies the address of the second home agent; and
    second home agent information notification means that notifies the second home agent of home agent information, the home agent information at least including an address of the first home agent or information that specifies the address of the first home agent.

* * * * *